United States Patent [15] 3,666,897
Harr [45] May 30, 1972

[54] RECORDING AND REPRODUCING SYSTEM WITH VIDEO HEADS READING BOTH INFORMATION DATA FROM OBLIQUE TRACKS AND ADDRESS DATA FROM THE LONGITUDINAL CONTROL TRACK

[72] Inventor: Jerome D. Harr, San Jose, Calif.

[73] Assignee: International Business Machines Corporation, Armonk, N.Y.

[22] Filed: Dec. 17, 1969

[21] Appl. No.: 885,765

[52] U.S. Cl. .................179/100.2 T, 178/6.6 P, 179/100.2 S
[51] Int. Cl. .................G11b 5/52
[58] Field of Search ...............179/100.2 T, 100.2 S, 100.2 B; 178/6.6 A, 6.6 P

[56] References Cited

UNITED STATES PATENTS

| | | | |
|---|---|---|---|
| 3,239,603 | 3/1966 | Kihara | 179/100.2 T |
| 3,322,892 | 5/1967 | Yasuoka et al. | 178/6.6 P |
| 3,278,678 | 10/1966 | Rank | 179/100.2 T |
| 3,188,385 | 6/1965 | Kihara | 179/100.2 T |
| 3,213,193 | 10/1965 | Konishi | 178/6.6 P |
| 3,429,992 | 2/1969 | Prochnow | 178/6.6 P |

*Primary Examiner*—Bernard Konick
*Assistant Examiner*—Robert S. Tupper
*Attorney*—Hanifin and Jancin and Edward W. Brown

[57] ABSTRACT

An elongated tape recording and reproducing system wherein a longitudinal control track is prerecorded on the edge of the tape either with a recording transducer, such as a magnetic head, as part of the system or off-line. After the control track is recorded, oblique video tracks are recorded on the tape with two video transducers or heads spaced 180° apart and traveling obliquely to the recorded control track. During reading of the video information, one obliquely traveling video head reads the address on the longitudinal recorded control track while the other obliquely traveling head reads the video information on the obliquely recorded video track. After the video heads have traveled 180°, their roles are reversed. That is, the video head which was reading the video information on the obliquely recorded track, now reads the address on the longitudinal recorded control track. In addition, the spacings between the address data on the control track serve as servo information for maintaining the tape and video heads in alignment.

15 Claims, 3 Drawing Figures

*INVENTOR*
JEROME D. HARR

*BY* *Edward W. Brown*
ATTORNEY

RECORDING AND REPRODUCING SYSTEM WITH VIDEO HEADS READING BOTH INFORMATION DATA FROM OBLIQUE TRACKS AND ADDRESS DATA FROM THE LONGITUDINAL CONTROL TRACK

BACKGROUND OF THE INVENTION

1. Field of the Invention

The present invention relates to a recording and reproducing method and system. More particularly, it relates to a method and system whereby information, such as video, is recorded and reproduced obliquely on a magnetic medium, and control data for the information including servo information is recorded longitudinally on the medium.

2. Description of the Prior Art

Prior recording and reproducing systems, such as video tape recorders, employ oblique tracks containing video information together with one or more longitudinal control tracks on a magnetic tape. In such systems, the longitudinal track is read by a stationary head aligned parallel with the longitudinal direction of the tape while the video information is read by one or more helical scanning heads traveling obliquely to the longitudinal direction of the tape. Thus, a magnetic head separate from the one or more video heads is required for reading the control information. Moreover, in order to read the control information during normal operation and fast forward and fast rewind of the tape, complex electronics in conjunction with the stationary head is necessary because of the speed differential between these two speeds, namely 250 : 1, In addition, the electronic in conjunction with the stationary head must be capable of reading the control information in both the forward and reverse direction.

SUMMARY OF THE INVENTION

Accordingly, it is an object of this invention to provide a recording and reproducing system employing an elongated recording medium, such as a video tape recorder, in which only simple electronics is necessary and in which a minimum number of transducers is required.

A further object of the present invention is to provide a recording and reproducing system which minimizes the speed differential for the transducer reading the control data between normal operation and fast forward or rewind of the elongated recording recording medium, and which permits the reading of the control data in the same direction regardless of the direction in which the tape is traveling.

Another object of the present invention is to provide a recording and reproducing system in which recording gaps in the control track on the elongated recording medium serves as servo information for maintaining constant control over the video heads and magnetic media.

These and other objects of the present invention are accomplished by a recording and reproducing system in which the substantially longitudinally recorded control data on an elongated recording medium is read by an obliquely traveling transducer. That is, the control data is either prerecorded on the tape in a longitudinal track preferably near one edge of the tape or recorded by a stationary transducer which is part of the recording and reproducing system. In one embodiment, two helical scanning transducers are mounted in preferably a 180° relationship, but the tape is wrapped around the scanning drum by an amount greater than 180°. In this manner, one of the two helical scanning transducers reads the control data associated with the video track of the other video transducer on that part of the tape wrapped more than 180° around the scanning drum.

As another feature of the present invention, the gaps between the control data serves as servo information for maintaining the heads and tape in the proper phase relationship.

Because of this novel and unique configuration, the following advantages result:

There is a minimum speed differential between normal operation and fast forward and fast rewind, because the transducer reading the control data is no longer stationary.

The control data is read in the same direction regardless of the direction of the tape, because the video transducer travels at a higher speed than the tape, even in fast forward or rewind operation.

As obvious from the two foregoing advantages, no separate read transducer is necessary for reading the control data thereby minimizing the number of transducers in the system. In addition, a single read transducer senses both the control data and the servo information.

The foregoing and other objects, features and advantages of the invention will be apparent from the following more particular description of a preferred embodiment of the invention.

DESCRIPTION OF THE PREFERRED EMBODIMENT

Figures 1, 2:
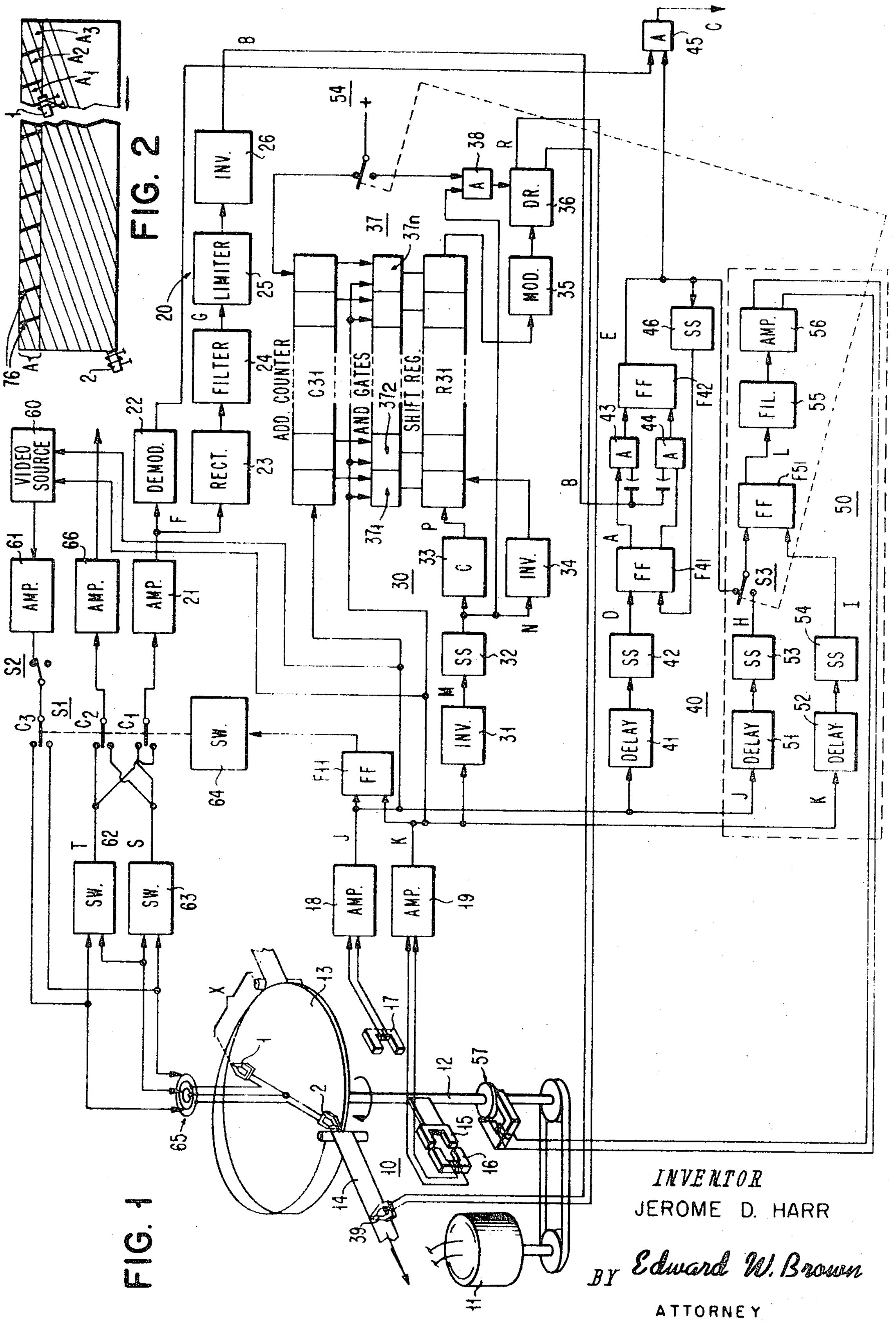
FIG. 1 is a schematic diagram of an embodiment of the present invention.
FIG. 2 is an enlargement of the video transducers and tape shown in FIG. 1 with the video tracks and control track visibly shown.

The tape transport 10 includes a motor 11 which drives drive shaft 12 having a suitable recording disk 13 fixed at one end. Mounted adjacent the recording disk 13 are two video heads 1 and 2. Rigidly mounted on the shaft 12 is a magnetic core member 15 which produces the pulses shown in K of FIG. 3 of the drawings when it passes a transformer 16. When core 15 passes transformer 17 it produces the pulses shown in J of FIG. 3. Magnetic tape 14 is wound about the disk 13 and is moved in the direction shown by some suitable means, such as a capstan, etc. Herein, slip rings 65 are employed so that the output of head 2 is applied to amplifier 63 and the output of head 1 is applied to the amplifier 62. When the pulses as shown in K (FIG. 3) are produced, the head 2 is located at the bottom of the tape 14 and at the beginning of an oblique video track as shown in FIG. 2. At this moment, the head 1 is at the bottom of a horizontal address track A. When the core 15 produces the pulses shown in J, the converse is true—that is, head 1 is beginning an oblique video track and head 2 is beginning to travel over horizontal address track A. Pulses from J will set a flip-flop F11 and the pulses K from amplifier 19 will reset this filp-flop.

As shown for convenience of explanation, circuit means such as an electro-mechanical contact switch S1 is employed having contact C1, C2, and C3 which are activated or moved by some suitable head switching circuit 64. When F11 is set by the pulses from amplifier 18 the contact C1, C2 and C3 will be moved to the up position. When the pulses from amplifier 19 reset F11 these contacts C1, C2 and C3 will be moved downwardly. When the contacts C1 and C2 are in the lower position, the output of head 1 is connected to an amplifier 21 of data channel 20. When contact C2 is down, head 2 is connected to reproducing means including video amplifier 66 and to the video output for application to a television monitor. When contacts C1 is up, the head 2 is connected to the data channel 20 and head 1 is connected to the video amplifier 66.

When contact C3 is up and S2 is in the record or up position, recording means including video source 60 is connected through amplifier 61 to head 1 and when the contact C3 is down the video source 60 is connected through an amplifier 61 to head 2. When switch S2 is in the playback position, the video source is disconnected from the system. Synchronizing information for video source 60 is provided by pulses J and K from amplifiers 18 and 19 respectively.

If desired, the switches S1 and S2 may be electronic, such as a diode gate rather than the electromechanical switches as shown.

Figure 3:
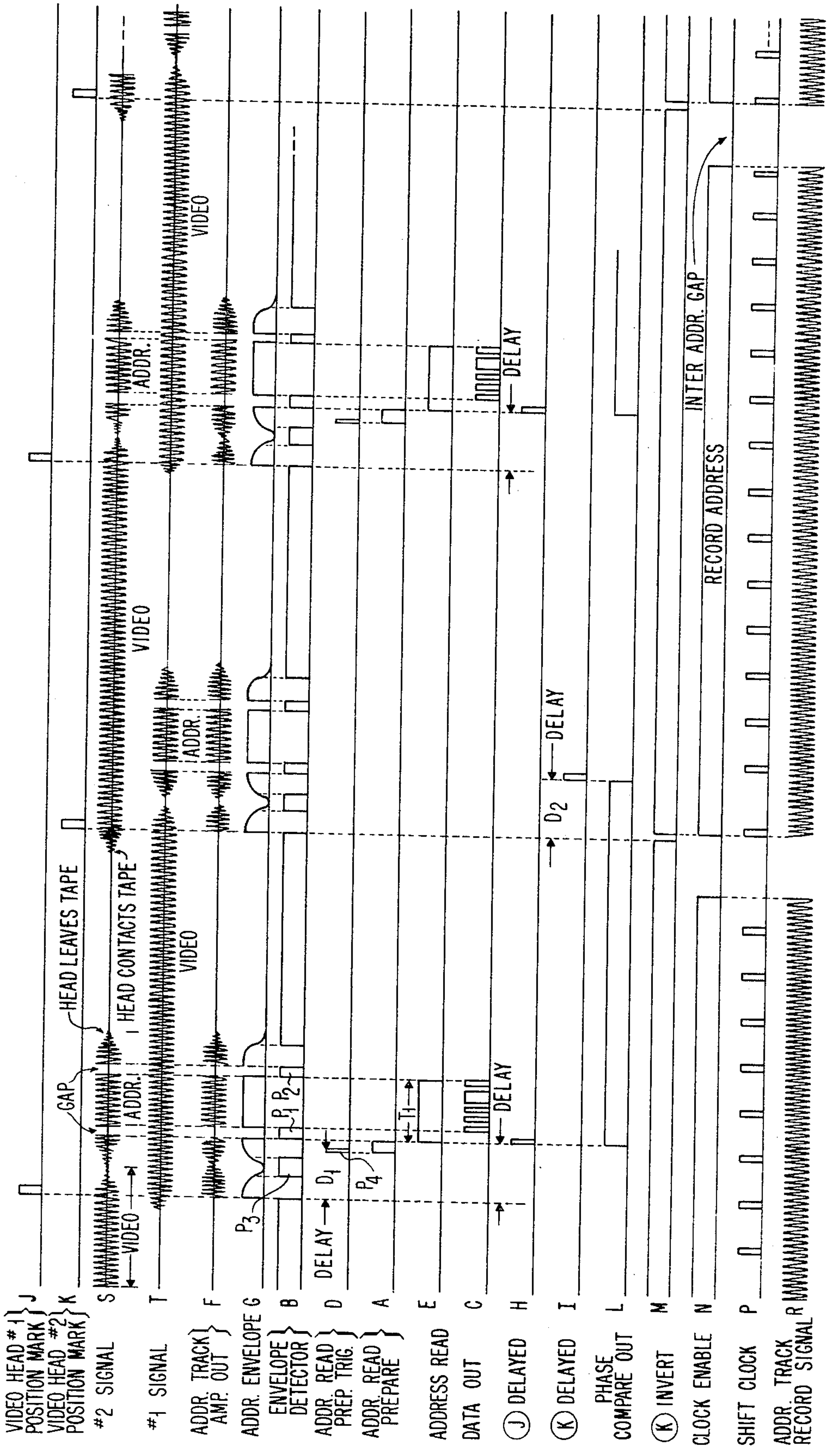
FIG. 3 is a timing diagram of the embodiment of FIG. 1.

A servo 50 is employed wherein the pulses from J are applied in sequence to a delay 51 and to a single shot 53 to produce the waveform shown in H in FIG. 3. In the recording address mode when the longitudinal track A is recorded switch S3 is down so that the pulses shown in H will set RS flip-flop F51. The pulses from K are applied to a delay 52 and then to a single shot 54 to produce pulses shown in I. The output of RS flip-flop F51 is now in the recording address mode L, as shown in FIG. 3. This signal is passed through a low pass filter 55 and then to a DC amplifier 56 to provide a DC signal to an eddy current brake 57 in the recording address mode. This results in a constant bias or direct current through the eddy current brake. For example, if the peak of the square wave shown in L is 12 volts in the recording address mode the constant bias will be approximately 6 volts DC. As will be explained later in detail, in playback an actual error signal is developed which will vary on either side of the 6 volt record level.

In the recording operation of the video recording and reproducing system, control data A is first recorded on the longitudinal track A of tape 14 by the magnetic head 39 from the address channel 30. As apparent from FIG. 2, the head 39 is skewed slightly to record the control track such that the recorded data will be substantially perpendicular to the path of the video heads 1, 2, by which it will be read. Thus, the video heads will be in proper registration with the recorded data in the control track so as to provide maximum signal output. Included in this channel 30 is address counter C31, each stage of which is connected to and provides an input to one of the AND gates $37_1$, $37_2$, etc., and $37_n$ in AND bank 37, the output of which is connected to and provides an input to shift register R31.

Pulse amplifier 19 is connected to and provides the pulses shown in K (FIG. 3) to the output of all of the AND gates $37_1$, $37_2$, etc., and $37_n$. Pulse amplifier 19 is also connected to inverter 31 of the address generator 30 so as to produce the waveform 2M (FIG. 3). The inverter 31 is connected to a single shot 32 which receives the waveform 2M and produces the waveform 2N (FIG. 3). When the waveform shown in 2N is up, the clock 33 is enabled and when it is down the clock 33 has no output. The output of clock 33 is shown in FIG. 3P and each clock pulse occurring therein shifts the contents of the shift register R31 so as to provide a serial output from this register. The output of shift register R31 is applied to a frequency shift keyer modulator 35 and then to a write driver 36. An example of this right driver output is shown in FIG. 3R so as to produce an address track such as A shown in FIG. 2.

Thus, it is seen that initially the counter C31 is set at a desired number such as one. When the pulses from FIG. 3J occur the address counter is positioned one count up. When the pulses from FIG. 3K occur this new count is shifted through AND gates 37 into shift register R31 which was previously reset. After a suitable delay of the occurrence of the pulses in FIG. 3K by inverter 31, a long duration single shot 32 produces an output shown in FIG. 3N which enables clock 33 and provides a serial output of the address in counter C31 from register R31. This address is then applied to the tape as shown in FIG. 3R. Because the head 39 (FIG. 1) records the control data at a slower rate (i.e.—normally 7.5 inches per second) than it is read by the video heads 1, and 2 (i.e.—normally 750 inches per second), the recorded address 3R is a greater length than the read address 3F in FIG. 3.

The waveform shown in 2N is inverted through an inverter 34 and applied to a shift register R31. Thus, after waveform N returns to zero and the shift register has been emptied, the shift register will then be reset to zero and the cycle will be repeated by a pulse shown in 3J increasing the count in counter C31 and the 3 cycle is repeated.

Address generator 30 only provides an output to the address head 39 when you want to record an address. In this condition, switch S4 is down to provide a one to AND gate 38 which enables the write driver 36. Furthermore, the write driver is only enabled during a time that the waveform N is up. When recording video or playing back, switch S4 is up so that AND gate 38 has no output and write driver 36 is disabled.

In recording video information, the video switch C3 is moved up and down by head switching circuit 64 and switch S2 is in the record position. The pulses from FIG. 3J and 3K are applied to recording means including the video source 60 so as to provide synchronizing pulses for reading out from a source such as vidicon tube (not shown). As a result, a first oblique track provides the first field of a video frame and the next oblique track provides the second field of this frame. Other conventional means of writing these video fields in synchronism with the transport can be employed.

For reading the control information, the tape 14 is wrapped around the disk 13 a sufficient number of degrees X, such as 20°, beyond 180°, as shown in FIG. 1 so that magnetic head 1 is starting to read the address data associated with video information which is starting to be read by magnetic head 2. From FIG. 2 and the waveform 3F (FIG. 3) it can be seen that portions of two address A1 and A3, and one whole address A2 of the address track 75 are read out because the head is traveling obliquely to the longitudinal address track. When video head 2 has rotated 180° from its original position and then occupies the same position as video head 1 did initially in FIG. 1, video head 2 will be starting into the address track, and video head 1 will contact the tape and start reading recorded information. The control information, specifically the address data which is read from the tape 14 is processed by a digital data channel 20 comprising an amplifier 21 which provides a signal as shown FIG. 3F to a demodulator 22. The output from the demodulator 22 goes to an AND gate 45 in the data read channel 40 from AND gate 45 is presented, for example, to circuitry which is well known in the art and which permits accessing any single desired video frame recorded on the tape.

Because portions of two addresses A1 and A3 are read along with the whole address A2, the output from the amplifier 21 is passed through a half wave rectifier 23 and a low pass filter 24 to produce the address envelope shown in FIG. 3G. The waveform in 3G is limited and then passes through an inverter 26 to produce the waveform shown in FIG. 3B.

A data out channel 40 receives the pulses shown in FIG. 3D. The pulses in FIG. 3D are applied to a flip-flop $F_{41}$ whose pulses set this flip-flop. When AND gates 43 and 44 have a one output they set or reset respectively a flip-flop $F_{42}$. The waveform B from digital channel 20 is applied to AND gates 43 and 44.

As another feature of the present invention, servo information is contained in the control track A as gaps 76, as shown in FIG. 2. Pulses P1 and P2 of FIG. 3B are produced by the gaps and pulses, such as P3, occur when the video head, such as H2 is finishing a video track and starting into the address track. In addition, the output pulse J from the amplifier 18 passed through a delay 41 where it is delayed for a time D1, after which it actuates single shot 42 producing a pulse P4 which sets latch F41. The purpose of the delay D1 and pulse P4 is to prevent pulse P3 from being confused as pulse P1, which indicates the start of an address. Latch F41 applies a one to AND gate 43 and a zero to AND gate 44. At the next occurrence of a gap a pulse such as P1 occurs so that the leading edge thereof provides a one output from AND gate 43 to set flip-flop F42. This commences a period described by a square pulse shown in FIG. 3E so that flip-flop F2 also is applied through a single shot shown 46 which resets flip-flop $F_{41}$ thereby providing a one to AND gate 44 and a zero to AND gate 43. As a result of this reset, AND gate 44 is conditioned to reset flip-flop F42 at the occurrence of a pulse P2 which is determined by the next space between the addresses, that is, the end of the address being read out. Thus, during the time period T1 the waveform in FIG. 3E enables the data to be read out. Herein, it will be one address for each video frame which constitutes two oblique tracks with each track having a video field recorded thereon. This, of course, will be read out through AND gate 45.

During playback of the recorded video, switch S3 of servo channel 30 will be in the up or playback position. As such, in the beginning of the time period T1 the flip-flop $F_{51}$ will be set by the pulse shown in FIG. 3E. The pulses shown in FIG. 3K are applied through a suitable delay 52 for a time D2 which triggers a single shot 54 whose output is pulses 3I which will reset the flip-flop $F_{51}$. The output of $F_{51}$ is shown in FIG. 3L and it can be seen that if, for example, the pulse P1 (FIG. 3), which indicates the address gap, occurs too early in relation to the pulse 3I, the phase compare output from F51, shown in FIG. 3L will be up longer than it is down. This produces a higher than normal output from filter 55, which, when passed through amplifier 56, will cause a decrease in the braking action of eddy current brake 57. This will result in an increase in speed of the video heads which will decrease the magnitude of the error. This servoing is employed both when the video is recorded and when the video and data is read out.

While the head rotational speed is corrected in the above-described servoing technique, it is to be understood that the same result may be received by correcting the speed of the tape by slowing or speeding up the tape transport drive.

While the invention has been particularly shown and described with reference to a preferred embodiment thereof, it will be understood by those skilled in the art that various changes in form and details may be made therein without departing from the spirit and scope of the invention.

What is claimed is:

1. A recording and reproducing system comprising:

a pair of transducers spaced from each other;

an elongated recording medium traveling longitudinally adjacent said transducers and having a substantially longitudinal control track recorded thereon containing address data, said transducers traveling at a relatively high rate of speed with respect to the longitudinal direction of the recording medium and at an angle to the longitudinal direction of the recording medium such that the transducers move in oblique tracks across said recording medium, the transducers being spaced from each other such that one of said transducers traverses an oblique track and reads data associated with said oblique track while the other transducer traverses said control track; and circuit means operable for switching said transducers between the oblique track and the control track whereby address data from the control track is read by the transducer traversing the control track for the transducer traversing the oblique track.

2. The system of claim 1 in which the control track of the recording medium contains a plurality of recording gaps and said system includes servo means responsive to the sensing of said gaps so as to maintain the transducers and recording medium in a predetermined phase relationship.

3. The system of claim 1 in which said system includes recording means connected to said switching means to provide information to be recorded by said transducers as they traverse the oblique tracks on said recording medium.

4. The system of claim 1 in which said system includes reproducing means connected to said switching means operable for processing the information read by said transducers as they traverse the oblique tracks.

5. The system of claim 1 in which the data recorded in said control track is skewed and the angle at which said transducers travel across said recording medium is such that the transducers are in proper registration with the recorded data in said longitudinal control track.

6. In a recording and reproducing system utilizing an elongated recording medium which travels longitudinally adjacent first and second transducers rotating at a relatively high speed with respect to the longitudinal direction of movement of the recording medium and at an angle to the longitudinal direction of the recording medium such that transducers move in oblique tracks across said recording medium, said system comprising:

a control track recorded substantially longitudinally on said recording medium and containing address data for the oblique tracks, said transducers being spaced apart such that one of the said transducers traverses said oblique track while said other transducer traverses said control track and reads address data associated with said oblique track; and circuit means operable for switching said transducers between said oblique track and said control track whereby said first transducer in traversing said control track reads the address data for the oblique track being traversed by said second transducer during a portion of the rotation of said transducers while during another portion of said rotation said second transducer reads the address data for the oblique track being traversed by said first transducer.

7. The system of claim 6 in which the control track of the recording medium contains a plurality of recording gaps and said system includes servo means responsive to the sensing of said gaps so as to maintain the transducers and recording medium in a predetermined phase relationship.

8. The system of claim 6 in which said system includes recording means connected to said switching means to provide information to be recorded by said transducers as they traverse the oblique tracks on said recording medium.

9. The system of claim 6 in which said system includes reproducing means connected to said switching means operable for processing the information read by said transducers as they traverse the oblique tracks.

10. The system of claim 6 in which the data recorded in said control track is skewed and the angle at which said transducers travel across said recording medium is such that the transducers are in proper registration with the recorded data in said longitudinal control track.

11. A transducing device for recording and reproducing information comprising:

a pair of transducers spaced from each other;

an elongated recording medium traveling longitudinally adjacent said transducers and having a substantially longitudinal control track recorded thereon, said transducers traveling at a relatively high rate of speed with respect to the longitudinal direction of the recording medium and at an angle to the longitudinal direction of the recording medium such that the transducers move in oblique tracks across said recording medium such that one of said transducers traverses an oblique track while the other transducer traverses said control track and reads data associated with said oblique track and both of said transducers being capable of reading the data recorded on said control track.

12. The device of claim 11 in which said transducers are spaced essentially 180° apart and said angle is such that one of said transducers starts to traverse an oblique track at the time the other transducer starts to traverse the control track.

13. The device of claim 11 in which the data recorded in said control track is skewed and the angle at which said transducers travel across said recording medium is such that the transducers are in proper registration with the recorded data in said longitudinal control track.

14. The device of claim 11 in which the control track of the recording medium contains a plurality of recording gaps and said system includes means responsive to the sensing of said gaps so as to maintain the transducers and recording medium in a predetermined relationship.

15. A transducing device for recording and reproducing information comprising:

a transducer;

an elongated recording medium traveling substantially longitudinally adjacent said transducer and having an essentially longitudinal control track recorded thereon, said transducer traveling at a relatively high rate of speed with respect to the longitudinal direction of the recording medium and at an angle to the longitudinal direction of the recording medium such that the transducer moves in oblique tracks across said recording medium for recording and reading information recorded in said tracks, said transducer in moving obliquely across said recording medium being operable for reading said longitudinal control track recorded thereon.

* * * * *